(12) United States Patent
Lehtimaki

(10) Patent No.: US 12,736,605 B2
(45) Date of Patent: Sep. 15, 2026

(54) PSEUDO-SPECTRUM AVERAGING FOR HIGH ACCURACY DISTANCE MEASUREMENTS

(71) Applicant: Silicon Laboratories Inc., Austin, TX (US)

(72) Inventor: Sauli Lehtimaki, Nummela (FI)

(73) Assignee: Silicon Laboratories Inc., Austin, TX (US)

( * ) Notice: Subject to any disclaimer, the term of this patent is extended or adjusted under 35 U.S.C. 154(b) by 350 days.

(21) Appl. No.: 18/521,370

(22) Filed: Nov. 28, 2023

(65) Prior Publication Data

US 2025/0172651 A1 May 29, 2025

(51) Int. Cl.
*G01S 5/02* (2010.01)
*G01S 5/14* (2006.01)

(52) U.S. Cl.
CPC ............ *G01S 5/0244* (2020.05); *G01S 5/145* (2013.01)

(58) Field of Classification Search
CPC ... H04W 64/00; H04W 16/28; H04W 64/006; H04W 4/029; H04W 88/08; H04W 24/02; H04W 64/003; H04W 4/025; H04W 4/33; H04W 4/027; H04W 88/02; H04W 36/322; H04W 84/005
See application file for complete search history.

(56) References Cited

U.S. PATENT DOCUMENTS 10,466,345 B1 * 11/2019 Sarrigeorgidis ...... G01S 5/0221
11,143,735 B2 10/2021 Lehtimaki
2014/0266904 A1 * 9/2014 Sendonaris ........... G01S 5/0218 342/385

* cited by examiner

*Primary Examiner* — Kwasi Karikari
(74) *Attorney, Agent, or Firm* — Nields, Lemack & Frame, LLC

(57) ABSTRACT

A system and method for determining the distance between two wireless network devices is disclosed. The present system utilizes a plurality of pseudo-spectrums to create a more accurate final pseudo-spectrum. The pseudo-spectrums are graphs, where peaks in the graphs are indicative of the magnitude of the signal received at a certain distance. In some embodiments, the pseudo-spectrums are generated using the MUSIC algorithm. The final pseudo-spectrum is generated by performing a mathematical operation on corresponding elements in each pseudo-spectrum. This mathematical operation may include multiplication and normalization. The final pseudo-spectrum provides a more accurate indication of the distance between the devices than can otherwise be achieved.

20 Claims, 7 Drawing Sheets

PSEUDO-SPECTRUM AVERAGING FOR HIGH ACCURACY DISTANCE MEASUREMENTS

FIELD

This disclosure describes systems and methods for determining the distance between two wireless network devices, and specifically, using averaging of multiple pseudo-spectrums to improve the accuracy of this determination.

BACKGROUND

The Bluetooth protocol has designed several techniques to implement high accuracy distance measurement (HADM). These include a phase based ranging approach and a round trip time approach. Typically, there are two devices associated with these approaches; an initiator device that initiates the distance measurement and a reflector device, which responds to the initiator device. The distance being measured is the distance between these two devices.

In the round trip time (RTT) approach, each device uses timestamps. Specifically, when a packet is transmitted, the transmitting device records a transmit timestamp. When that packet arrives, a receive timestamp is used by the receiving device.

In the phase based approach, the initiator device determines the incoming phase for signals transmitted at two different frequencies. The phase measured ($\theta_{init}$) at the initiator device may be approximately the difference in phase between the two devices (i.e. $\Delta\theta_{ir}$), added to the product $2\pi*f*(tp)$, where f is the frequency of the transmitted signal and tp is the trip delay. If this phase is measured at two different frequencies, and the difference is taken, the result is $(\theta_{init1})-(\theta_{init2})=2\pi*f1*(tp)-2\pi*f2*(tp)$, or $2*\pi*(f1-f2)*(tp)$. Based on this equation, the trip delay may be calculated and then converted to a distance. This approach may be enhanced through the use of the multiple signal classification (MUSIC) algorithm. The MUSIC algorithm uses this information to generate pseudo-spectrums which may be used to determine the distance between the two devices.

However, these existing algorithms have limitations. For example, for the phase-based approach, in a heavy multipath environment, the pseudo-spectrum used for distance estimation often has multiple peaks and the desired line-of-sight signal does not always produce the highest peaks on the pseudo-spectrum. Changes in signal frequency, a slight movement of the tracked device in the multipath environment or noise in the process can cause the algorithm to produce drastically different pseudo-spectrums for a comparatively static situation.

Consequently, an improved system and method would be beneficial. Further, it would be advantageous if the improved system did not require a large amount of computational processing.

SUMMARY

A system and method for determining the distance between two wireless network devices is disclosed. The present system utilizes a plurality of pseudo-spectrums to create a more accurate final pseudo-spectrum. The pseudo-spectrums are graphs, where peaks in the graphs are indicative of the magnitude of the signal received at a certain distance. In some embodiments, the pseudo-spectrums are generated using the MUSIC algorithm. The final pseudo-spectrum is generated by performing a mathematical operation on corresponding elements in each pseudo-spectrum. This mathematical operation may include multiplication and normalization. The final pseudo-spectrum provides a more accurate indication of the distance between the devices than can otherwise be achieved.

According to one embodiment, a method of improving accuracy of a distance measurement between two wireless network devices is disclosed. The method comprises performing a channel sound procedure using the two wireless network devices a plurality of times so as to acquire a plurality of measurements; executing a MUSIC algorithm for each of the plurality of measurements to create a plurality of pseudo-spectrums, wherein each of the plurality of pseudo-spectrums comprises a graph that indicates magnitude as a function of distance; performing a mathematical operation on the plurality of pseudo-spectrums to produce a final pseudo-spectrum; and determining a distance between the two wireless network devices based on the final pseudo-spectrum. In some embodiments, the mathematical operation comprises multiplying corresponding elements from each of the plurality of pseudo-spectrums to form the final pseudo-spectrum. In certain embodiments, a weight is used to compute each element in the final pseudo-spectrum. In certain embodiments, the weight includes a compressing factor that causes the magnitude of peaks in the final pseudo-spectrum to be more closely spaced. In certain embodiments, the compressing factor comprises a logarithm or square root function. In certain embodiments, the weight includes a selective factor, which indicates a likelihood that a certain peak represents an actual distance between the two wireless network devices. In some embodiments, the plurality of measurements are acquired at a plurality of different frequencies. In some embodiments, pseudo-spectrums are continuously created and the final pseudo-spectrum is generated using a rolling average. In some embodiments, values of the distance are varied for different pseudo-spectrums. In some embodiments, a first pseudo-spectrum is created using a first plurality of grid positions, and wherein based on peaks found in the first pseudo-spectrum, a number of grid positions used for subsequent pseudo-spectrums is reduced. In some embodiments, the distance is determined to be a leftmost peak in the final pseudo-spectrum. In some embodiments, the distance is determined to be a leftmost peak in the final pseudo-spectrum having a magnitude greater than a predetermined threshold.

According to another embodiment, a method of improving accuracy of a distance measurement between two wireless network devices is disclosed. The method comprises a. performing a channel sound procedure using the two wireless network devices so as to acquire an initial measurement;
b. executing a MUSIC algorithm using the initial measurement to create a first pseudo-spectrum, wherein the first pseudo-spectrum comprises a graph that includes a plurality of grid positions that represent distance values and a magnitude associated with each of the distance values;
c. assigning a weight to the magnitude for each distance value in the first pseudo-spectrum;
d. multiplying the weight and the magnitude for each distance value to generate a final pseudo-spectrum;
e. performing a channel sound procedure using the two wireless network devices so as to acquire a subsequent measurement;
f. executing a MUSIC algorithm using the subsequent measurement to create a subsequent pseudo-spectrum;

g. assigning a weight to the magnitude for each distance value in the subsequent pseudo-spectrum;

h. multiplying the weight and the magnitude for each distance value in the subsequent pseudo-spectrum with a corresponding value in the final pseudo-spectrum and using a product of the multiplying as a new value in the final pseudo-spectrum; and i. determining a distance between the two wireless network devices based on the final pseudo-spectrum.

In some embodiments, steps e-h are repeated a plurality of times. In some embodiments, the weight includes a compressing factor that causes the magnitude of peaks in the final pseudo-spectrum to be more closely spaced. In certain embodiments, the compressing factor comprises a logarithm or square root function. In some embodiments, the weight includes a selective factor, which indicates a likelihood that a certain peak represents an actual distance between the two wireless network devices. In some embodiments, the plurality of subsequent measurements are acquired at a plurality of different frequencies. In some embodiments, the distance is determined to be a leftmost peak in the final pseudo-spectrum. In some embodiments, the distance is determined to be a leftmost peak in the final pseudo-spectrum having a magnitude greater than a predetermined threshold.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
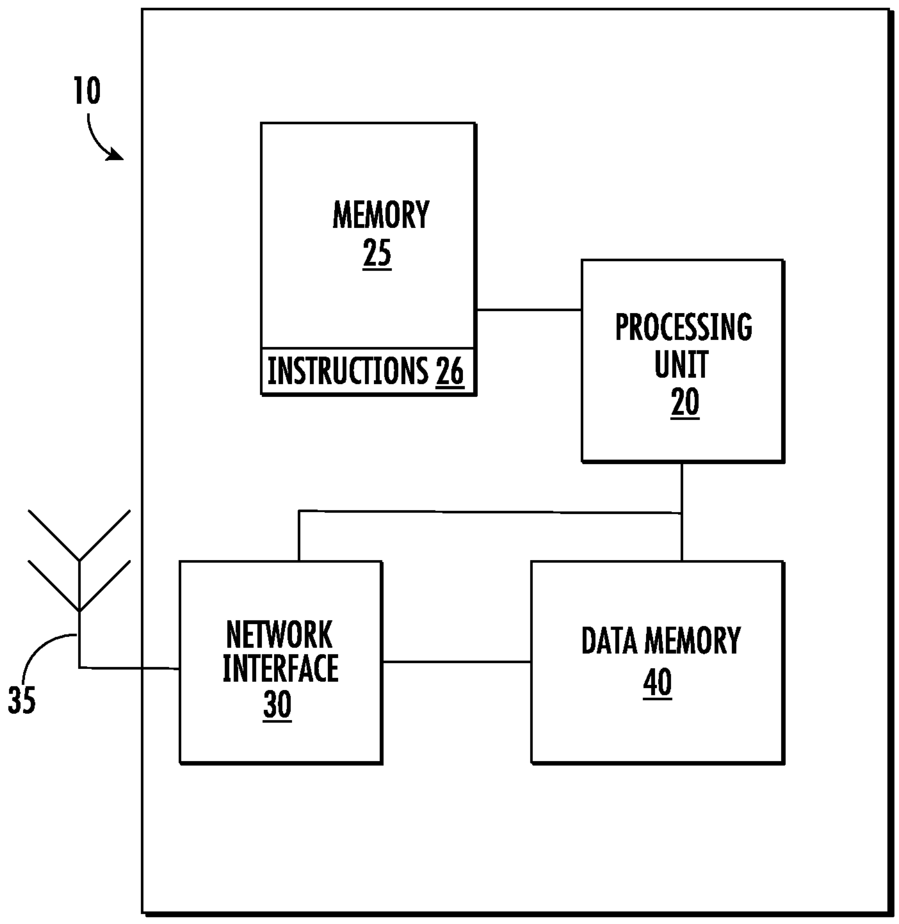
FIG. 1 is a block diagram of a representative initiator device that may estimate distance according to one embodiment.

FIG. 1 shows a block diagram of a representative network device. This network device may serve as an initiator device 10, as described in more detail below. This network device may also be used to determine the distance to a remote device, also referred to as a reflector device.

The initiator device 10 has a processing unit 20 and an associated memory device 25. The processing unit 20 may be any suitable component, such as a microprocessor, embedded processor, application specific circuit, a programmable circuit, a an microcontroller, or another similar device. This memory device 25 contains the instructions 26, which, when executed by the processing unit 20, enable the initiator device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The initiator device 10 also includes a network interface 30, which may be a wireless interface including an antenna element 35.

The wireless signals first enter the network interface 30 through antenna element 35. The antenna element 35 is in electrical communication with a low noise amplifier (LNA). The LNA receives a very weak signal from the antenna element 35 and amplifies that signal while maintaining the signal-to-noise ratio (SNR) of the incoming signal. The amplified signal is then passed to a mixer. The mixer is also in communication with a local oscillator, which provides two phases to the mixer. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer are then fed into programmable gain amplifier (PGA). The PGA amplifies the $I_m$ and $Q_m$ signals by a programmable amount. These amplified signals may be referred to as $I_g$ and $Q_g$. The amplified signals, $I_g$ and $Q_g$, are then fed from the PGA into an analog to digital converter (ADC). The ADC converts these analog signals to digital signals, $I_d$ and $Q_d$. These digital signals may then pass through a channel filter. The filtered signals are referred to as I and Q. These I and Q signals can be used to recreate the amplitude and phase of the original signal.

The network interface 30 may support any wireless network, such as Bluetooth, Wi-Fi, networks utilizing the IEEE 802.15.4 specification, such as Zigbee, networks utilizing the IEEE 802.15.6 specification, and wireless smart home protocols, such as Z-Wave. The network interface 30 is used to allow the locator device to communicate with other devices disposed on the network.

The initiator device 10 may include a data memory device 40 in which data that is received and transmitted by the network interface 30 is stored. This data memory device 40 is traditionally a volatile memory. The processing unit 20 has the ability to read and write the data memory device 40 so as to communicate with the other nodes in the network. Although not shown, the initiator device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions 26 may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the initiator device 10. The instructions contained on this second computer readable media may be downloaded onto the memory device 25 to allow execution of the instructions by the initiator device 10.

While the processing unit 20, the memory device 25, the network interface 30, and the data memory device 40 are shown in FIG. 1 as separate components, it is understood that some or all of these components may be integrated into a single electronic component. Rather, FIG. 1 is used to illustrate the functionality of the initiator device 10, not its physical configuration.

Figure 2:
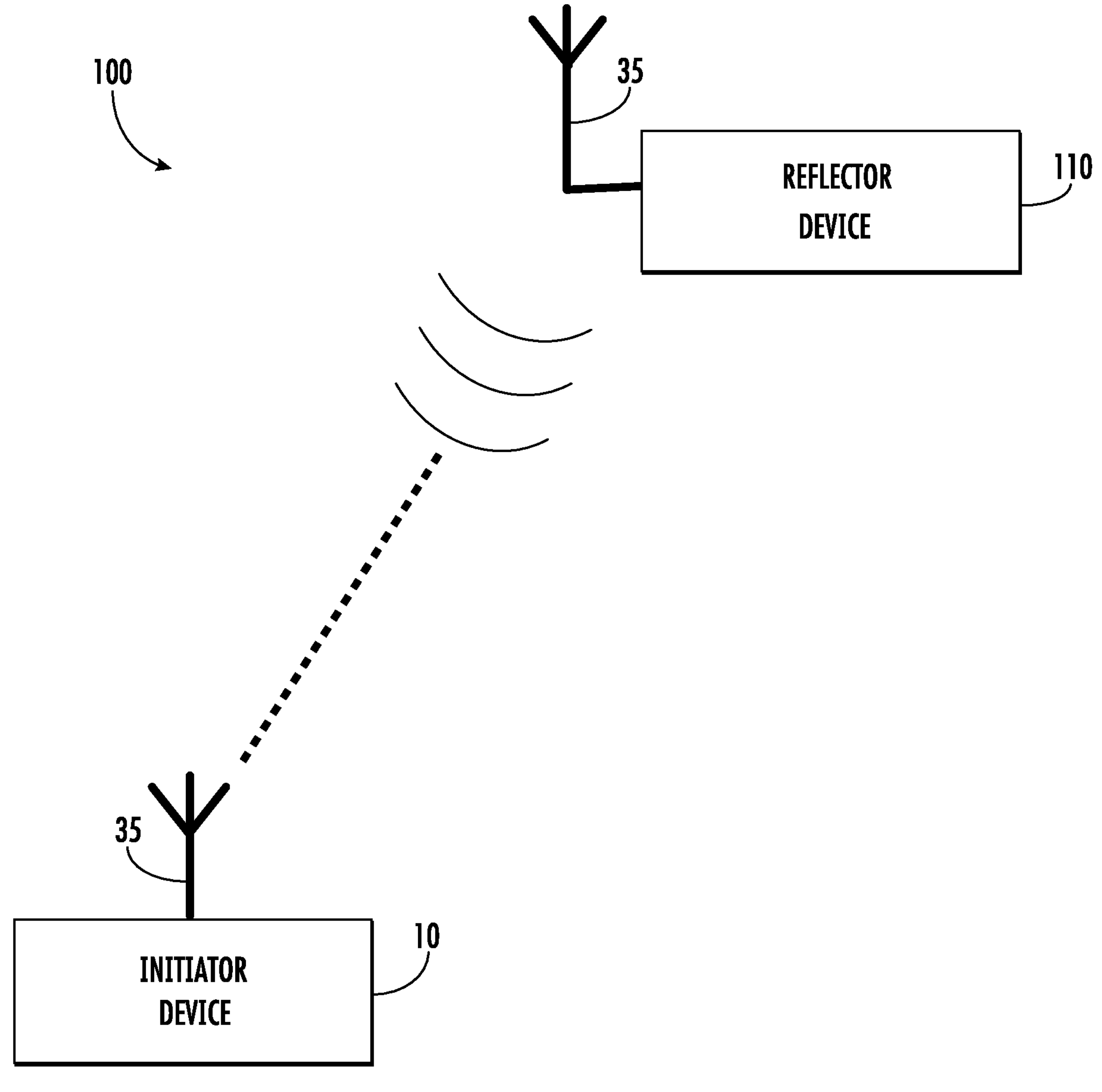
FIG. 2 shows a network having an initiator device and at least one reflector device according to one embodiment.

FIG. 2 shows a network 100 having at least one reflector device 110 and an initiator device 10. In certain embodiments, the reflector device 110 may be a network device and contain many of the components described above and shown in FIG. 1. However, the reflector device 110 may have a smaller amount of memory and may have less computational ability.

In FIG. 2, the initiator device 10 may transmit a signal, containing a sine wave having a first frequency to the reflector device 110. In response, the reflector device 110 may transmit signal containing a sine wave having the same first frequency toward the initiator device 10.

In certain embodiments, this signal is transmitted using a network protocol, such as Bluetooth.

The initiator device 10 may utilize the I and Q signals described above to determine the amplitude and phase of the signal arriving at the antenna element 35. This information may then be used to calculate the distance from the initiator device 10 to the reflector device 110.

Specifically, the Bluetooth specification now describes a Channel Sounding procedure, during which the initiator device 10 transmits a first signal at a first frequency to the reflector device 110. The reflector device 110 measures the magnitude and phase of the incoming first signal. In response, the reflector device 110 transmits a second signal having the first frequency back to the initiator device 10. The initiator device 10 measures the magnitude and phase of the incoming second signal. This may be repeated for a number of different frequencies. Based on the magnitude and phase information gathered by the initiator device 10 and the reflector device 110, the channel transfer function may be estimated.

As a specific example, the Bluetooth specification defines the following procedure to determine the channel transfer function.

First, $\theta_{CH}(f)$ represents the phase delay of the channel, where f is the channel frequency, and $\Delta\theta_{LO}(f)$ represents the relative difference in phase of the RF carrier between the initiator device and the reflector device. Based on this, the relative phases of a carrier measured at the reflector and initiator's antenna is $\theta_{REFL}(f)=\theta_{CH}(f)+\Delta\theta_{LO}(f)$ and $\theta_{INIT}(f)=\theta_{CH}(f)-\Delta\theta_{LO}(f)$. $A_{REFL}(f)$ and $A_{INIT}(f)$ represent the amplitude of that measured carrier at the reflector and initiator's antenna, respectively. Phase correction term (PCT) is defined by the angle that, if added to the internal angle of the local oscillator, would result in a phase identical to that of the incoming signal. The I and Q values represented by the PCT measured at the reflector and initiator, respectively, are given by $$PCT_{REFL}(f) = A_{REFL}(f)\, e^{i\theta}_{REFL}(f) \text{ and}$$

$$PCT_{INIT}(f) = A_{INIT}(f)\, e^{i\theta}_{INIT}(f).$$

If the communication channel is symmetrical between the initiator device 10 and the reflector device 110, the measured phases are dependent on both the communication channel and the relative difference in phase of the RF carrier between the devices. The communication channel transfer function can then be estimated from $$H^2(f) = A_{REFL}(f)e^{i\theta}_{REFL}(f)\times A_{INIT}(f)e^{i\theta}_{INIT}(f) = A_{CH^2}(f)e^{i2\theta}_{CH}(f).$$

The channel transfer function may then be used to compute the distance between the initiator device 10 and the reflector device 110.

For example, the multiple signal classification (MUSIC) algorithm utilizes the channel transfer function information to determine the distance between the initiator device 10 and the reflector device 110. The channel transfer function is supplied to the MUSIC algorithm as the captured data measurement vector. The MUSIC algorithm then estimates the covariance matrix R of this captured data measurement vector. Eigendecomposition is then performed on the covariance matrix and a set of eigenvectors are selected corresponding to the noise subspace.

The phase delay at a particular frequency is defined as 2π*d/λ, where d is the distance the signal travels and λ is the wavelength at that frequency, defined as c/f, where c is the speed of light and f is the frequency in question. Further, the time of travel is defined as d/c. Substituting, the phase delay may be defined as 2πft.

A pseudospectrum is then created using the noise subspace and a steering vector, which may be a function of angle, ω. The steering vector may alternatively use other variables, such as time, as the independent variable. However, regardless of which independent variable is used for the steering vector, the results may be converted to distance. The angle, ω, may be expressed as 2πtΔf, where Δf is the change in frequency, which may be around 1 MHz. The maximum distance that can be measured without phase wrapping is defined as max_distance=c/Δf. Substituting this definition into the equation for ω results in 2πtc/max_distance, or t=ω*max_distance/2πc. Solving for distance yields d=ct or d=ω*max_distance/2π. The use of the MUSIC algorithm for spectral estimation has been extensively studied. Similarly, the use of the MUSIC algorithm to determine magnitude as a function of angle and/or distance has also been investigated and a more detailed explanation of the theory of operation is not included herein. After execution, the MUSIC algorithm creates a graph, such as that shown in FIG. 3, where the horizontal axis represents distance and the vertical axis represents magnitude. In this way, each peak on the graph represents a magnitude of the incoming signal at that distance. As noted above, the MUSIC algorithm may use angle as the independent variable, but this can be readily converted to distance. This graph may be referred to as a pseudo-spectrum.

Figure 3:
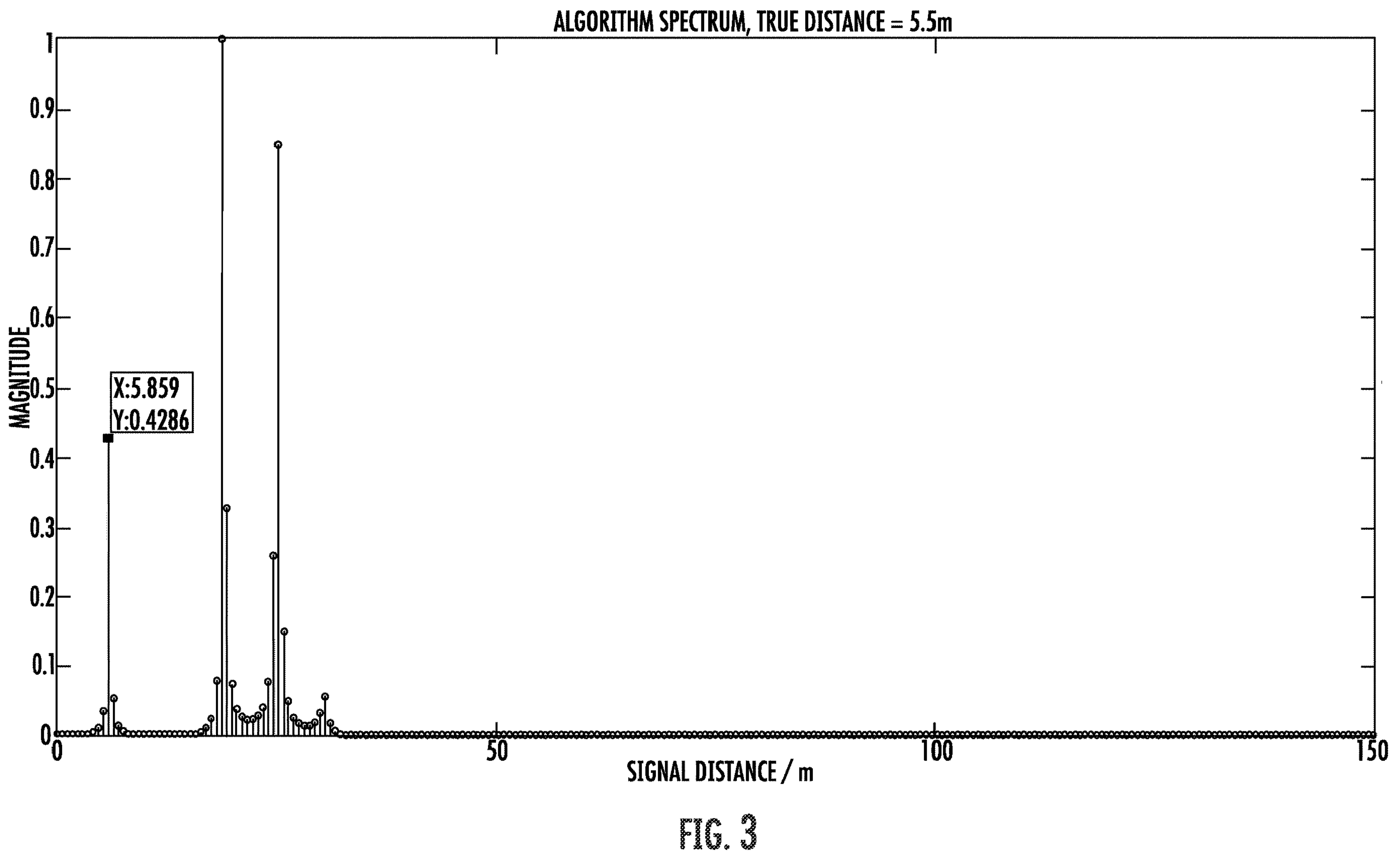
FIG. 3 shows a pseudo-spectrum according to one embodiment.

The MUSIC algorithm calculates the magnitude of the signal at each of a plurality of time values, referred to as a grid. The incoming signal is a combination of the line-of-sight signal, as well as other reflected signals. FIG. 3 shows one such pseudo-spectrum that includes three large peaks and several smaller ones. Typically, the line of sight path is the shortest distance and therefore represents the actual distance between the initiator device 10 and the reflector device 110. The other peaks are generated from paths that include reflections, which make those paths longer. Thus, based on the pseudo-spectrum in FIG. 3, it may be determined that the reflector device 110 is about 5.5 meters away.

FIG. 3 shows an example where there is multipath interference. Note that in some circumstances, the multipath interference is not constant. For example, objects may move in the environment, changing the multipath interference. However, it is likely that the line of sight path remains relatively constant. Additionally, the MUSIC algorithm may generate phantom peaks, also referred to as artifacts. These phantom peaks are also not constant.

These facts may be used to improve the distance estimate provided by the MUSIC algorithm. In some embodiments, pseudo-spectrum averaging may be used to improve the accuracy of the distance estimation.

Figure 4:
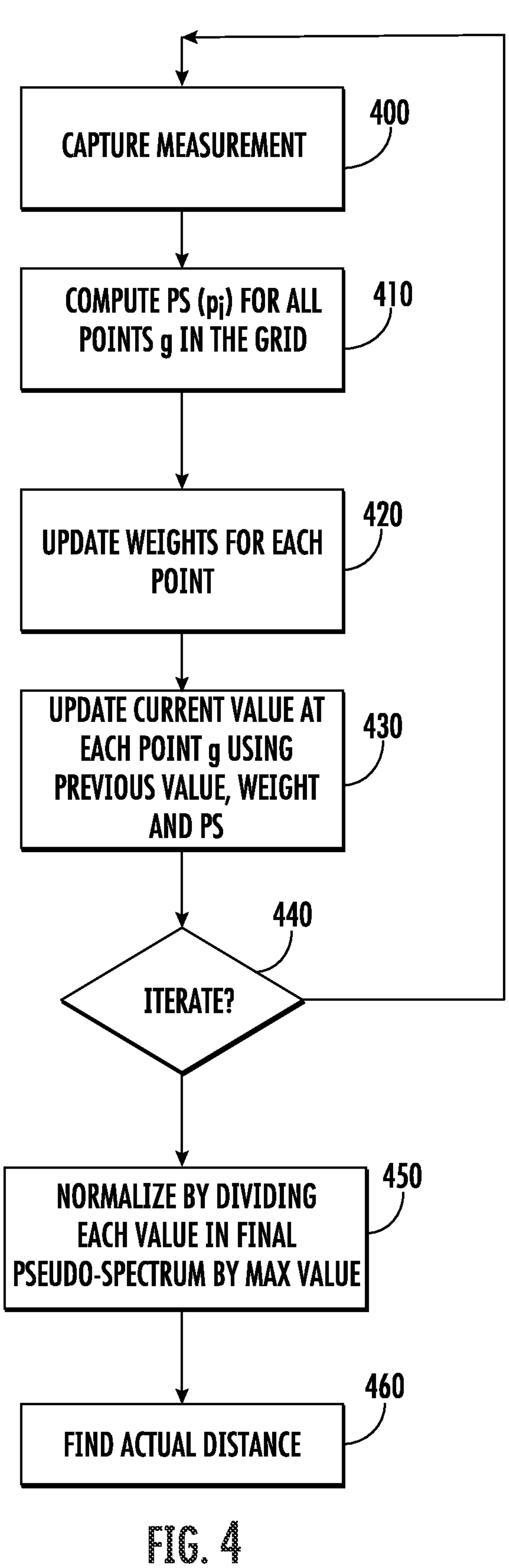
FIG. 4 shows a sequence to generate a more accurate distance measurement.

FIG. 4 shows a sequence of operations that may be performed to improve the estimate provided by the MUSIC algorithm. First, all variables are initialized. A measurement is then captured, as shown in Box 400. Then, as shown in Box 410, the MUSIC algorithm is executed using a plurality of grid positions, each grid position referred to as $g_i$, where i represents the number of the grid position that is computed by the MUSIC algorithm. A grid position is a value of ω, which translates to a specific distance. The value computed by the MUSIC algorithm at a grid position $g_i$ is referred to as $PS_i$. Note that PS is a vector having dimension equal to the total number of grid positions that are computed by the MUSIC algorithm. This vector is also referred to as the pseudo-spectrum.

Weights, referred to as $w_i$, may optionally be calculated for each grid position, as shown in Box 420. These weights may also be expressed as a vector having the same dimension as PS. In some embodiments, weights may not be employed, such that $w_i$ is equal to 1 for all i. In other embodiments, the weight may be a selective factor, referred to as $S_i$, which may vary as a function of distance. The selective factor is used to favor (or disfavor) certain distances or ranges of distances. For example, higher selective factors may be applied to grid positions that are associated with a higher likelihood that the reflector device 110 is located at this range. For example, in some scenarios, it may be expected that the reflector device 110 is located between 5 and 30 meters from the initiator device 10. Thus, in this scenario, grid positions that correspond to this range of distances may be given greater selective factors than grid positions outside this range. The selective factor may also be expressed as a vector having the same dimension as PS.

Additionally, in certain embodiments, the weights may include a compressing factor that serves to compress the peaks such that their magnitudes are closer together. For example, one such compressing factor may include $$\frac{\log_{10}(PS_i + k)}{PS_i},$$

wherein k may be determined empirically. In another embodiment, the compressing factor may include $$\frac{\sqrt{(PS_i + k)}}{PS_i}.$$

Of course, other compressing factors may be used.

Thus, in certain embodiments, the weight for each grid position is given as the product of a selective factor and a compressing factor. One example may be as follows:

$$w_i = S_i * \frac{\log_{10}(PS_i + k)}{PS_i}$$

Next, as shown in Box 430, the current result at each grid position is updated using the following equation:

$$B_i(\text{current}) = B_i(\text{previous}) * w_i * PS_i$$

where $B_i$(current) refers to the current result of this algorithm as computed for grid position $g_i$, $B_i$(previous) refers to the previous saved value for grid position $g_i$, $w_i$ is the weight associated with this grid position and $PS_i$ is the value computed by the MUSIC algorithm at this grid position. Note that B may also be expressed as a vector having the same dimension as PS.

Next, as shown in Decision Box 440, a decision is made as to whether to iterate this part of the sequence again. If so, the processes shown in Boxes 400-430 are repeated and $B_i$(previous) is set to the current value of $B_i$ (i.e., $B_i$(current)). Note that in certain embodiments, the measurement may be performed using a different frequency. If no more iterations are needed, all of the values in the B vector may be normalized by dividing them by the largest value in the vector, as shown in Box 450 and expressed below:

$$B_i = \frac{B_i}{\max(B)}$$

Note that in some embodiments, normalization may not be performed. This results in the final pseudo-spectrum. Lastly, as shown in Box 460, the actual distance is determined from the final pseudo-spectrum. In some embodiments, the actual distance may be the leftmost peak in the final pseudo-spectrum, since this represents the shortest path between the two devices. In other embodiments, the actual distance may be the leftmost peak that exceeds a predetermined threshold. Note that the actual distance is synonymous with line of sight distance.

Figure 5:
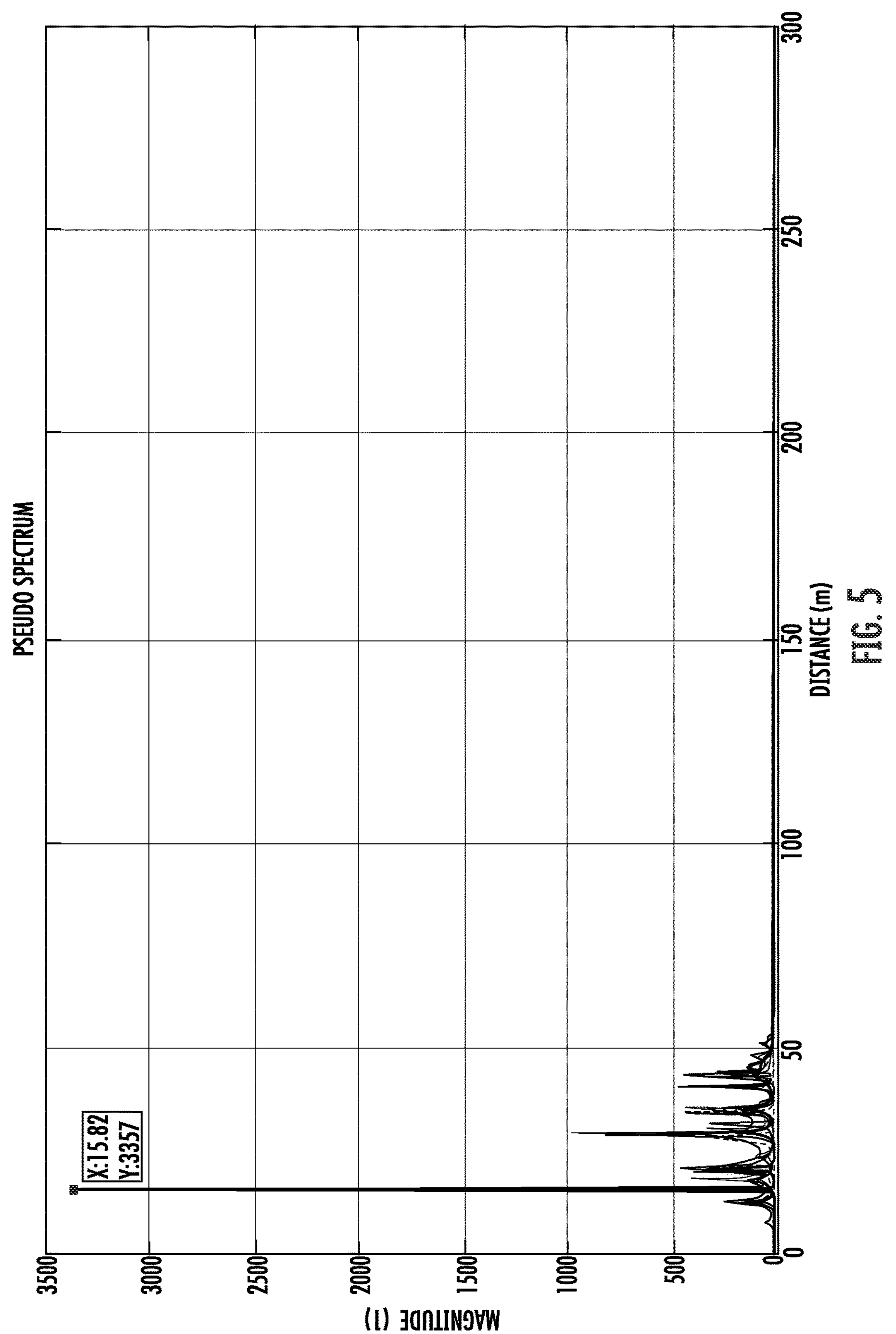
FIG. 5 shows a plurality of pseudo-spectrums.
Figure 6:
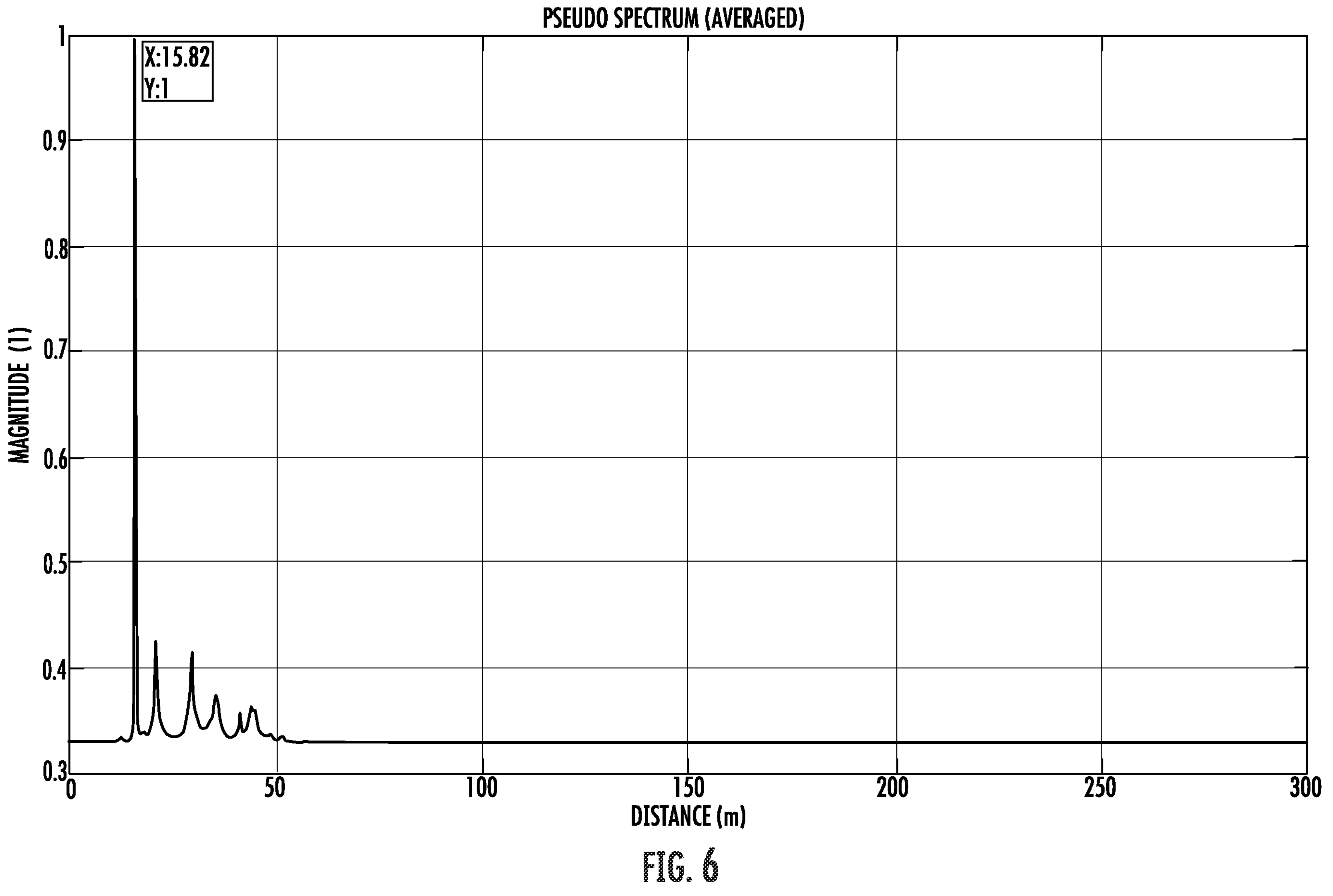
FIG. 6 shows the final pseudo-spectrum according to a first embodiment after executing the sequence shown in FIG. 4.

FIG. 5 shows a graph that includes a plurality of pseudo-spectrums that are superimposed on one another. Each pseudo-spectrum includes a plurality of peaks of varying magnitude, making determination of the actual distance difficult. Note as well that there is at least one small peak to the left of the tallest peak. FIG. 6 shows the resulting final pseudo-spectrum after the algorithm of FIG. 4 has been executed using ten pseudo-spectrums. This graph was created using a weight ($w_i$) for each grid position as described above, where the selective factor is equal to 1, the compressing factor utilizes the logarithm function and k in the compressing factor is set to 1000. Note that the peaks of these pseudo-spectrums have now been consolidated into a much smaller number of discrete peaks that may be easily identified in the final pseudo-spectrum. Note that, due to the normalization step in Box 450, the largest peak has a value of 1. Also, due to the compressing factor in the weights, each peak has a magnitude of at least 0.3. In one embodiment, the leftmost peak of the final pseudo-spectrum is selected as the actual distance. In another embodiment, the leftmost peak having a magnitude greater than a threshold is selected as the actual distance. This threshold may be predetermined based on the compressing factor that is used for the weights. For example, in the graph shown in FIG. 6, a threshold of 0.4 would ensure that the correct peak is selected.

Figure 7:
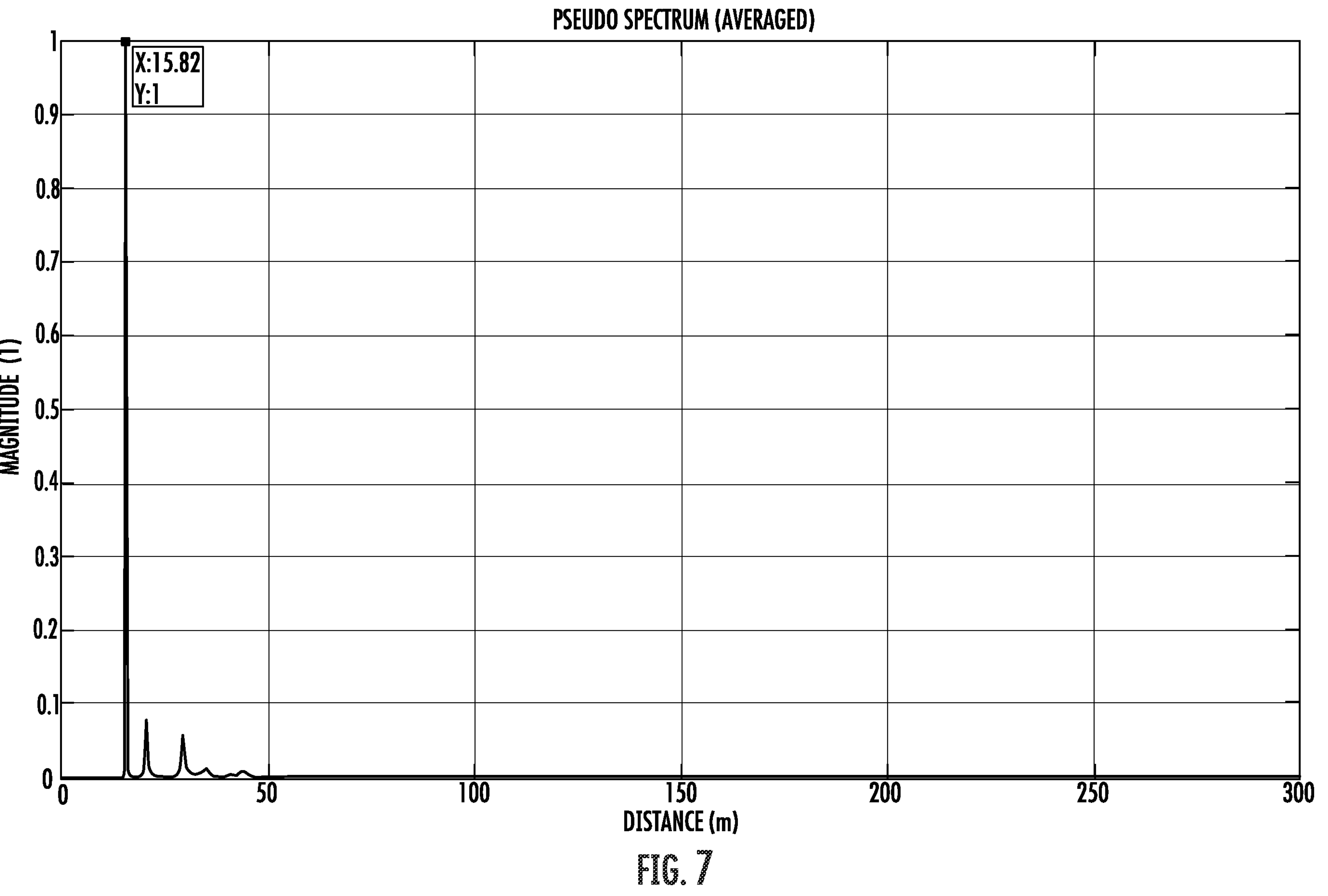
FIG. 7 shows the final pseudo-spectrum according to a second embodiment after executing the sequence shown in FIG. 4.

FIG. 7 shows a second final pseudo-spectrum that was generated using a weight ($w_i$) for each grid position as described above, where the selective factor is equal to 1, the compressing factor utilizes the logarithm function and k in the compressing factor is set to 10. Note that the smaller value of k results in less compression in the vertical direction, such that one peak has a normalized magnitude of 1, while all of the others have a magnitude of less than 0.1. Again, in one embodiment, the leftmost peak of the final pseudo-spectrum is selected as the actual distance. In another embodiment, the leftmost peak having a magnitude greater than a threshold is selected as the actual distance.

The particular values for the selective factor and the coefficients in the compressing factor may be determined empirically. Additionally, if a threshold is used to determine the correct peak, this threshold may also be determined empirically.

While FIG. 4 shows one sequence that may be executed to determine a more accurate distance measurement, variations of this sequence are also possible. For example, as noted above, the normalization step may not be performed. Additionally, the weights may include the selective factor, the compressing factor, both factors or neither factor.

Additionally, to improve resolution, the exact values used for the grid positions may change slightly for each iteration. For example, assume that the first pseudo-spectrum is calculated using a steering vector that includes the angle values that correspond to 1 meter, 2 meters, and so on. A subsequent pseudo-spectrum may be computed using a steering vector that includes angle values that correspond to 1.01 meters, 2.01 meters, and so on. This process may be referred to as dithering the grid positions.

Additionally, rather than using all previous pseudo-spectrums for calculating the final pseudo-spectrum, a rolling or moving window may be used, wherein only the last N pseudo-spectrums are used to compute the final pseudo-spectrum from which the actual distance between the initiator device 10 and a reflector device 110 is determined.

Further, the above disclosure describes the averaging process as involving the multiplication of the previous value, the weight and the current value of the pseudo-spectrum, other averaging techniques may be used. For example, rather than using:

$$B_i(\text{current}) = B_i(\text{previous}) * w_i * PS_i$$

The algorithm may use:

$$B_i(\text{current}) = B_i(\text{previous}) * w_i * PS_i$$

Finally, the process described above may be made less compute intensive if desired. For example, the first pseudo-spectrum may be computed using a large number of grid positions. Based on the values in the first pseudo-spectrum, the number of grid positions used in the generation of subsequent pseudo-spectrums may be reduced. In some embodiments, the grid positions used for the subsequent pseudo-spectrums may be limited to those grid positions that generated a peak having a magnitude greater than a predetermined threshold in the first pseudo-spectrum. In another embodiment, the grid positions used for the subsequent pseudo-spectrums may be limited to a range that encompasses many of the peaks detected in the first pseudo-spectrum.

In some embodiments, the sequence shown in FIG. 4 may be executed by the initiator device 10, since it has all of the necessary data. In another embodiment, the initiator device 10 may offload this data and the required calculations to an external computational device.

The present system has many advantages. First, as described above, the MUSIC algorithm may generate phantom peaks, which are not indicative of actual distance. These may be caused due to interference or sampling noise created in a multipath environment. By generating multiple pseudo-spectrums and averaging these pseudo-spectrums, these artificial or phantom peaks may be reduced or eliminated, while the actual peaks remain. This allows a truer measure of distance. Additionally, if dithering is used, the accuracy or resolution of the line of sight peak is likely to be improved. Lastly, as shown in FIGS. 6-7, this approach converges on the correct line of sight distance in a small number of iterations. In some embodiments, 5 or more pseudo-spectrums may be sufficient to converge on the actual distance.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of improving accuracy of a distance measurement between two wireless network devices, comprising:

performing a channel sound procedure using the two wireless network devices a plurality of times so as to acquire a plurality of measurements, the plurality of measurements indicative of a channel transfer function;

executing a MUSIC algorithm for each of the plurality of measurements to create a plurality of pseudo-spectrums, wherein each of the plurality of pseudo-spectrums comprises a graph that indicates magnitude as a function of distance;

performing a mathematical operation on the plurality of pseudo-spectrums to produce a final pseudo-spectrum; and determining a distance between the two wireless network devices based on the final pseudo-spectrum.

2. The method of claim 1, wherein the mathematical operation comprises multiplying corresponding elements from each of the plurality of pseudo-spectrums to form the final pseudo-spectrum.

3. The method of claim 2, wherein a weight is used to compute each element in the final pseudo-spectrum, wherein each element is multiplied by one or more respective weights.

4. The method of claim 3, wherein the weight includes a compressing factor that causes the magnitude of peaks in the final pseudo-spectrum to be more closely spaced.

5. The method of claim 4, wherein the compressing factor comprises a logarithm or square root function.

6. The method of claim 3, wherein the weight includes a selective factor, which indicates a likelihood that a certain peak represents an actual distance between the two wireless network devices.

7. The method of claim 1, wherein the plurality of measurements are acquired at a plurality of different frequencies.

8. The method of claim 1, wherein pseudo-spectrums are continuously created and the final pseudo-spectrum is generated using a rolling average.

9. The method of claim 1, wherein values of the distance are varied for different pseudo-spectrums.

10. The method of claim 1, wherein a first pseudo-spectrum is created using a first plurality of grid positions, and wherein based on peaks found in the first pseudo-spectrum, a number of grid positions used for subsequent pseudo-spectrums is reduced.

11. The method of claim 1, wherein the distance is determined to be a leftmost peak in the final pseudo-spectrum.

12. The method of claim 1, wherein the distance is determined to be a leftmost peak in the final pseudo-spectrum having a magnitude greater than a predetermined threshold.

13. A method of improving accuracy of a distance measurement between two wireless network devices, comprising:

a. performing a channel sound procedure using the two wireless network devices so as to acquire an initial measurement, the initial measurement indicative of a channel transfer function;
b. executing a MUSIC algorithm using the initial measurement to create a first pseudo-spectrum, wherein the first pseudo-spectrum comprises a graph that includes a plurality of grid positions that represent distance values and a magnitude associated with each of the distance values;
c. assigning a weight to the magnitude for each distance value in the first pseudo-spectrum;
d. multiplying the weight and the magnitude for each distance value to generate a final pseudo-spectrum;
e. performing a channel sound procedure using the two wireless network devices so as to acquire a subsequent measurement, the subsequent measurement indicative of a channel transfer function;
f. executing a MUSIC algorithm using the subsequent measurement to create a subsequent pseudo-spectrum;
g. assigning a weight to the magnitude for each distance value in the subsequent pseudo-spectrum;
h. multiplying the weight and the magnitude for each distance value in the subsequent pseudo-spectrum with a corresponding value in the final pseudo-spectrum and using a product of the multiplying as a new value in the final pseudo-spectrum; and
i. determining a distance between the two wireless network devices based on the final pseudo-spectrum.

14. The method of claim 13, wherein steps e-h are repeated a plurality of times.

15. The method of claim 13, wherein the weight includes a compressing factor that causes the magnitude of peaks in the final pseudo-spectrum to be more closely spaced.

16. The method of claim 15, wherein the compressing factor comprises a logarithm or square root function.

17. The method of claim 13, wherein the weight includes a selective factor, which indicates a likelihood that a certain peak represents an actual distance between the two wireless network devices.

18. The method of claim 14, wherein the plurality of subsequent measurements are acquired at a plurality of different frequencies.

19. The method of claim 13, wherein the distance is determined to be a leftmost peak in the final pseudo-spectrum.

20. The method of claim 13, wherein the distance is determined to be a leftmost peak in the final pseudo-spectrum having a magnitude greater than a predetermined threshold.

* * * * *